Dec. 12, 1967  G. WINTRISS  3,358,194
MALFUNCTION DETECTOR FOR AUTOMATIC MACHINES
Filed March 31, 1965
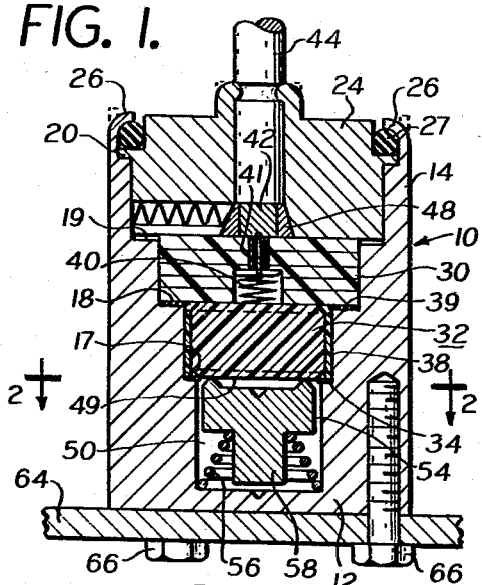
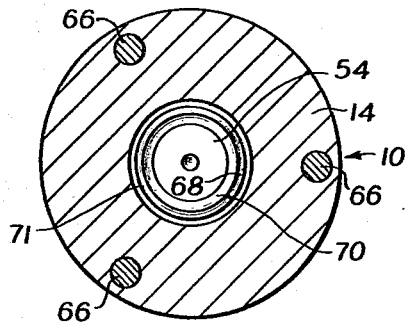
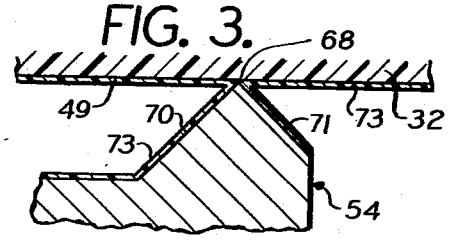
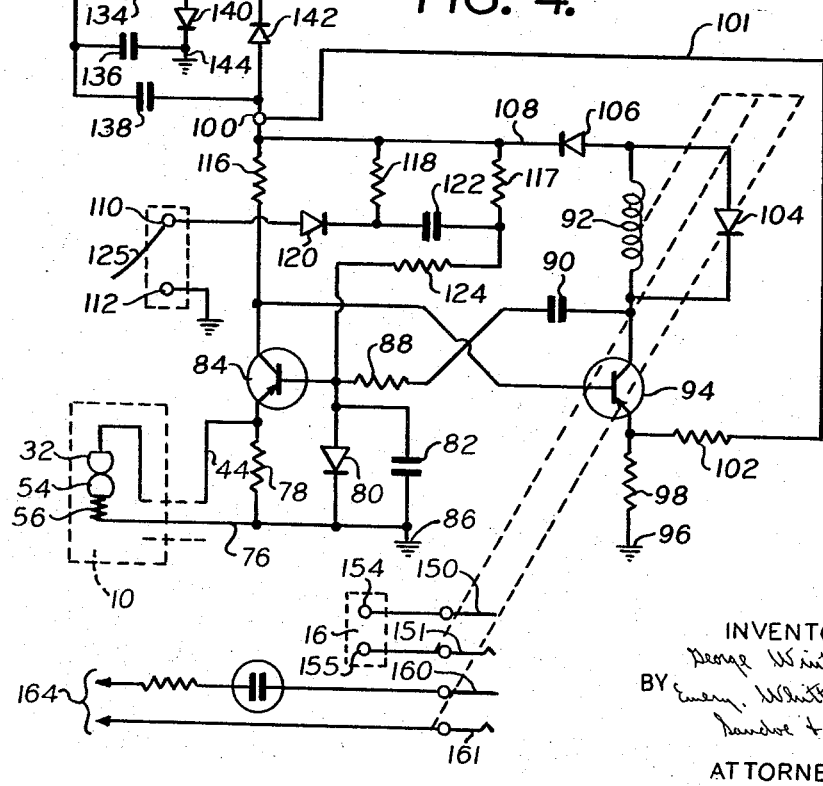
INVENTOR
George Wintriss
BY
ATTORNEYS.

United States Patent Office 3,358,194
Patented Dec. 12, 1967

3,358,194
MALFUNCTION DETECTOR FOR AUTOMATIC MACHINES
George Wintriss, Carversville, Pa., assignor to Industrionics Controls, Inc., New York, N.Y., a corporation of New York
Filed Mar. 31, 1965, Ser. No. 444,360
13 Claims. (Cl. 317—142)

This invention relates to malfunction detectors for automatic machines. More particularly, the invention relates to signal pickup devices that detect the malfunctioning of a machine by a signal or change in signal sequence.

It is an object of the invention to provide an improved impact-sensitive device for producing an electric signal in response to an impact. The improvements relate to constructions that make the device more sensitive and that make it multidirectional, i.e., sensitive to impact force from any direction.

It is another object to provide an inertia-operated impact detector that is highly sensitive to impacts from directions other than that in which the inertia element moves. Features of the invention relate to a combination for reducing wear and for making the apparatus rugged and capable of much longer unattended service than detector apparatus of the prior art.

Still another object is to obtain electric signals, from detector apparatus, which are of sufficient length and strength to operate a relay or perform some other useful function in control equipment. Impact signals are often too short in duration to be useful for operating control equipment, and one feature of this invention relates to a converter for increasing the duration of the signal produced by an impact device.

Other objects, features and advantages of the invention will appear or be pointed out as the description proceeds.

In the drawing, forming a part hereof, in which like reference characters indicate corresponding parts in all the views:

FIGURE 1 is a vertical sectional view of the impact-sensitive detector made in accordance with this invention;

FIGURE 2 is a sectional view taken on the line 2—2 of FIGURE 1;

FIGURE 3 is a greatly enlarged, fragmentary view of a portion of the apparatus shown in FIGURE 1; and FIGURE 4 is a wiring diagram for the apparatus shown in the other figures combined with a converter for increasing the length of the electric signals produced by an impact or other signal-producing cause.

The impact detector shown in FIGURE 1 includes a cup 10 having a bottom 12 and side wall 14. In the preferred construction, the cup 10 is of circular cross section; and the inside of the cup is made with a number of different diameters and shoulders 17; 18; 19 and 20 at the locations where the diameters change. In the construction illustrated, the cup 10 is made of metal, preferably aluminum, and the bottom 12 and side wall 14 are of one-piece construction.

At the upper end of the cup 10 there is a plug 24 which seats against the shoulder 19 and which has an upper flange that seats against the shoulder 20. Upper edge portions 26 of the cup 10 are bent inwardly to hold the plug 24 securely in the cup 10, and there is a sealing ring 27 between the plug 24 and the inwardly bent edge portion 26 for sealing the interior of the cup.

Before the parts are inserted into the cup 10, and before the plug 24 is permanently secured in place, the upper edge portion 26 of the cup extends in the direction indicated by dotted lines.

The plug 24 holds a cylindrical block of insulation 30 downward against a metal block 32. This metal block 32 seats on a washer 34 which is made of electrical insulating material for preventing actual contact of the block 32 with the shoulder 17, but the washer 34 is supported by the shoulder and the metal block 32 is clamped against the washer 34 by pressure from the insulation 30.

The metal block 32 is also insulated from the cup by a sleeve 38 made of insulating material, and preferably of du Pont "Mylar."

There is another washer 39 on the shoulder 18. The washers 34 and 39 are preferably made of rubber, or some other compressible material which allows for variations in the manufacturing tolerances of the cup 10 and the shoulders in the cup.

The top of the block 32 is electrically connected by an electrical conductor 40 to a contact 41 at the end of a conductor 42 which has insulation 44 surrounding it where it passes through the plug 24. The lower end of the conductor or cable 42 is insulated from the plug 24 by a grommet or bushing 48 made of electrical insulating material. Thus the conductor 42 in the insulated cable is electrically connected to the metal block 32 which serves as a relatively fixed electrical contact in the cup 10. This block 32 preferably has a flat bottom 49.

The cup 10 encloses a chamber 50 below the block 32. There is another metal block 54 which is an inertia element and which is movable toward and from the bushing 48 of the relatively fixed contact 32. This movable element 54 has a height dimension slightly less than the distance from the bottom of the block 32 to the bottom of the chamber 50. There is a spring 56 which gives the movable element 54 a bias toward its uppermost position in which the movable element 54 touches the fixed contact 32.

The movable element 54 is of substantially smaller diameter than the chamber 50 and it is held out of contact with the sides of the chamber 50 by the spring 56. This result is attained by having the spring 56 conical and by having the movable element 54 made with a stem 58 which fits snugly into the convolution at the smaller end of the conical spring 56.

The convolution at the larger end of the spring 56 fits snugly in the lower end of the chamber 50 and this holds the spring 56 centered in the chamber 50. The movable element 54 is thus centered in the chamber 50 and held out of contact with the side wall so as to eliminate friction of the movable element with the side wall of the chamber.

The spring 56 is made of metal and conducts electricity so that it not only gives the movable element 54 a bias toward its uppermost position, but it also provides a good electrical path between the movable element 54 and the housing or cup 10. The spring 56 is, therefore, a part of an electric circuit from the conductor 42 through the contact 41, electrical conductor 40, fixed contact 32, and movable element 54. The conductor 42 may be considered the terminal for one side of the detector circuit, and the cup 10 may be considered the terminal for the other side of the detector circuit. A conductor can be connected to the outside of the cup 10 by spot welding or in any other suitable manner.

The outside surface of the bottom of the cup 10 can be used as an abutment surface, if desired; but in the preferred construction there is a plate 64 connected to the bottom of the cup 10 by screws 66 located at angularly spaced regions around the circumference of the cup. This plate 64 may be made of material harder than that used for the cup 10; for example, steel, and the outside surface of the steel plate 64 provides an abutment surface which is more resistant to wear than would be the case with the aluminum bottom of the cup 10.

When a workpiece, or other element, strikes the abutment surface of the plate 64, the shock transmitted to the cup 10 causes the movable element 54 to move away from the fixed contact 32 and to break the electrical circuit through the detector.

The abutment surface can be located on any side of the cup 10, or the cup can be located in a box or other enclosure which is subject to impingement by workpieces or to other impact-producing phenomena. In order to make the detector sensitive to impulses from any direction, the movable element 54 is made with a sharp edge 68, best shown in FIGURE 3. This sharp edge is the part of the movable element 54 which contacts with the fixed contact 32. The sharp edge 56 is at the top of a ridge formed by converging side walls 70 and 71, which converge as they extend toward the fixed contact 32; and these sides 70 and 71 both extend at acute angles to the face 49 of the fixed contact 32.

The contacting surfaces of the movable element 54 and the fixed contact 32 are coated with silicone 73 and this silicone extends over substantial areas of the confronting faces of the movable element 54 and the fixed contact 32. If desired, the chamber 50 can be filled with silicone, and when it is, the silicone performs the additional function of damping the movement of the movable element 54 and thus causing a time delay in the operation of the detector.

Since pulses or impact forces to be detected are often of extremely short duration, it is preferable to have the confronting faces of the movable element 54 and fixed contact 32 supplied with a generous coating of silicone without having the chamber 50 filled with liquid.

The multidirectional sensitivity of the detector of this invention apparently comes from an inclined plane action by the sloping sides 70 and 71 when the movable element 54 is jarred in a direction having a component parallel to the face 49 of the fixed contact 32. A force, jarring the movable element 54 in such a direction, apparently causes the sloping side 70 or 71 (depending upon the direction of the force), to climb up on the silicone coating on the face 49 and thus break the contact of the metal of the sharp edge 68 with the face 49 of the fixed contact 32.

By using a more viscous silicone 73, this effect is increased. In practice, good results are obtained with a silicone having a viscosity of the order of 100,000 centistokes.

The pressure of the spring behind the movable element 54 causes the sharp edge 68 to penetrate the silicone 73 and again to establish the contact of the movable element 54 with the face 49 of the fixed contact 32. The time to reestablish this contact depends upon the viscosity of the silicone.

The use of higher viscosity for the silicone will obtain a time delay in the initial response to the impact under some circumstances. This may not be desirable where the effect of the impact is of extremely short duration, because the impact may not last long enough to open the circuit. Less viscous silicone increases the sensitivity of the detector, but it also tends to decrease the time that the circuit remains open. The electric pulse produced by the breaking of the circuit through the detector may have a duration of substantially less than 100 milliseconds. Such a short pulse is ordinarily not enough to operate a relay for a controller circuit and this invention provides means for converting extremely short pulses into longer pulses for operating a relay and for delivering control pulses of longer duration than the original impact pulse. This will be described in connection with FIGURE 4.

In addition to providing multidirectional sensitivity for the detector, the silicone also serves another important function. No matter how well sealed the detector may be, it does not seem possible to prevent the accumulation of dirt at the regions where dry contacts make and break the current during the operation of a detector. With the liquid silicone on the surfaces where the current makes and breaks, dirt does not accumulate. There is an actual movement of the liquid which washes the contact areas and experience has demonstrated that this washing action keeps the areas clean indefinitely in a sealed chamber.

FIGURE 4 shows control means comprising a converter for producing pulses of uniform and of much longer duration than the electrical signals which come from the detector. The fixed contact 32 and the movable element 54 are shown diagrammatically in the housing or cup 10 which is represented by a dotted rectangle in FIGURE 4. The conductor from the fixed contact 32 is indicated by the reference character 44. A conductor 76 continues the circuit from the spring 56. Actually this conductor 76 is attached to the cup 10.

The conductors 44 and 76 are connected with a resistor 78, a recitifier comprising a diode 80 and a capacitor 82, connected as shown in FIGURE 4 with a transistor 84. This circuit, which includes the detector, is grounded at 86. The detector in the housing or cup 10, the resistor 78, and the capacitor 82, and their conductors joining them with the rest of the circuitry is the impact pick-up circuit, and may be considered a "first circuit."

The transistor 84 is connected in a controller circuit having a resistor 88 in series with a capacitor 90 leading to one side of a coil of a relay 92. There is another transistor 94 in the controller circuit with a connection to ground at 96 through a resistor 98. Power is supplied to the controller circuit from a terminal 100 through a conductor 101 and resistor 102. A diode 104 is connected across the operating coil of the relay 92 and another diode 106, oriented in the opposite direction to the diode 104, is connected with a conductor 108 leading to resistors 116 and 117. The resistor 116 is connected with the first transistor 84; and the resistor 117 is grounded through the diode 80. This control circuit includes a multivibrator hook-up which produces pulses of uniform length and substantial duration in the relay coil 92.

This controller circuit is connected with a "third circuit" for receiving impulses from a probe connected with a terminal 110 of the third circuit. This third circuit includes a resistor 118, a diode 120, a capacitor 122 and a resistor 124 connected as shown with the probe terminal 110, and this third circuit is normally open through the probe 125 and receives an impulse when the probe is grounded by a workpiece, or in some other way depending upon the manner in which the probe 125 is used. The completion of the circuit by grounding is represented by a ground terminal 112.

Power is supplied to the circuits shown in FIGURE 4 from a power line 128 which may be 110 volts alternating current. This power is supplied to the primary 130 of a transformer 132 having a secondary 134, connected with capacitors 136 and 138 and diodes 140 and 142. One side of the secondary 134 is connected to ground at 144, and the other side is connected with the terminal 100. This terminal connects with the wiring diagram of FIGURE 4 at the upper left-hand portion of the diagram and also with the resistor 102 near the lower right-hand corner of the diagram.

The relay 92 has two contacts 150 and 151 which are closed when the coil of relay 92 is energized and when these contacts are closed, an electric signal pulse can flow in an external circuit connected with terminals 154 and 155 of the converter circuit.

Energizing of the relay 92 also closes two other contacts 160 and 161 of the relay to complete a power circuit indicated by the reference character 164. The contacts 150, 151, 160 and 161 and their conductors are another circuit, and the length of time that this other circuit is closed depends upon how long the relay coil 92 is energized.

The multi-vibrator circuit constitutes an "electronic device" which is triggered by operation of the detector in the cup 10, or by the probe connected with the terminal 110 or by interruption of a light beam supplied to a photo-cell (in place of the impact detector in the housing 10), to produce an electric pulse of uniform and longer duration than the signal that triggers the operation. This longer signal is sufficient to energize the relay 92 and operate the relay contacts 150, 151, 160 and 161 to produce a control of the equipment which is intended to respond to the impact or signal pulse that is supplied to the controller or "converter" circuit.

This control may be used for stopping an automatic machine in the event that an impulse is not received at a particular time in a cycle, or for any other control forming no part of the present invention.

The preferred embodiments of the invention have been illustrated and described, but changes and modifications can be made and some features can be used in different combinations without departing from the invention as defined in the claims.

What is claimed is:

1. An impact-sensitive detector including a housing enclosing a chamber having sides, a movable contact element in the chamber, a relatively fixed contact in the chamber, the movable contact element having a face that confronts the fixed contact, said face having a sharp edge that contacts with the fixed contact to close an electric circuit, terminals on the housing and constituting part of the electric circuit, the movable contact being biased against the fixed contact, and said bias being of a value so as to permit disengagement from the fixed contact on a predetermined force exerted against the housing to open said circuit.

2. The detector described in claim 1 characterized by a coating of silicone on the surfaces of the movable element and the relatively fixed contact that touch one another.

3. The detector described in claim 2 characterized by the silicone being a viscous liquid that adheres to areas of the confronting faces of the movable element and fixed contact beyond the portions which touch one another.

4. The detector described in claim 2 characterized by the silicone being a liquid with a viscosity of the order of 100,000 centistokes.

5. The detector described in claim 1 characterized by the relatively fixed contact including a flat surface, and the sharp edge of the movable element being a ridge projecting from the face of the movable element and having sides that converge to form the sharp edge.

6. The detector described in claim 5 characterized by both sides of the ridge being inclined at an acute angle with respect to the surface of the fixed contact which the ridge touches, and the silicone being a coating of viscous liquid on the surface of the relatively fixed contact whereby sudden movement of the ridge transversely of its length causes the sloping sides of the ridge to ride up temporarily on the viscous liquid and out of contact with the relatively fixed contact.

7. The detector described in claim 6 characterized by each of the converging sides of the ridge being at an angle of approximately 45° to the confronting face of the relatively fixed contact.

8. The detector described in claim 6 characterized by the viscous liquid being silicone.

9. The detector described in claim 1 characterized by the movable element fitting freely in the chamber and being movable transversely as well as axially with respect to the fixed contact, a spring imparting the bias to the movable element toward the relatively fixed contact, said spring being conical and having its axis substantially coincident with the direction of axial movement of the movable element, the spring having its larger end confined by the sides of the chamber against lateral displacement, confining surfaces on the movable element held by the other end of the conical spring for holding the movable element out of contact with the sides of the chamber when the movable element is in a state of rest.

10. The detector described in claim 9 characterized by the movable element having a stem that fits snugly into the small end of the conical spring and the sides of which constitute the confining surfaces on the movable element, the stem being removable from the spring and the spring being removable from the chamber for replacement by another spring of different strength to change the sensitivity of the detector.

11. The detector described in claim 1 characterized by a first electric circuit outside of the detector but in series with the detector, a controller circuit including electronic means connected with the first circuit and triggered by a current change in the first circuit to produce a signal of longer duration than the current change in the first circuit which triggers the electronic means.

12. The detector described in claim 11 characterized by a relay in the controller circuit having an operating coil in the circuit with the electronic means and operated by the longer signal in the controller circuit.

13. The detector described in claim 11 characterized by a power supply device for the controller circuit, and the electronic means being transistors connected in a multivibrator circuit.

References Cited

UNITED STATES PATENTS

| | | | |
|---|---|---|---|
| 3,229,060 | 1/1966 | Russakov | 200—61.53 X |
| 3,238,321 | 3/1966 | Lawwill et al. | 200—61.08 |
| 3,263,039 | 7/1966 | Wintriss | 200—61.45 |

MILTON O. HIRSHFIELD, Primary Examiner.

J. A. SILVERMAN, Assistant Examiner.